(12) United States Patent
Kasamsetty et al.

(10) Patent No.: US 6,748,388 B1
(45) Date of Patent: Jun. 8, 2004

(54) METHOD AND MECHANISM FOR STORING AND MANAGING SELF-DESCRIPTIVE HETEROGENEOUS DATA

(75) Inventors: Ravikanth Kasamsetty, Redwood City, CA (US); Ravi Murthy, Hayward, CA (US); Rajagopalan Govindarajan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 349 days.

(21) Appl. No.: 09/938,999

(22) Filed: Aug. 24, 2001

(51) Int. Cl.[7] .............................................. G06F 17/30
(52) U.S. Cl. .................. 707/10; 2/101; 2/103
(58) Field of Search .................. 707/10, 104, 4, 707/102, 100, 101; 709/202, 203, 218; 717/114

(56) References Cited

U.S. PATENT DOCUMENTS

| | | | | |
|---|---|---|---|---|
| 5,557,790 A | * | 9/1996 | Bingham et al. | 707/101 |
| 5,687,367 A | * | 11/1997 | Dockter et al. | 707/102 |
| 5,745,895 A | * | 4/1998 | Bingham et al. | 707/10 |
| 5,970,490 A | * | 10/1999 | Morgenstern | 707/10 |
| 6,009,428 A | * | 12/1999 | Kleewein et al. | 707/10 |
| 6,061,515 A | * | 5/2000 | Chang et al. | 717/114 |
| 6,591,272 B1 | * | 7/2003 | Williams | 707/102 |
| 6,643,650 B1 | * | 11/2003 | Slaughter et al. | 707/10 |
| 6,643,652 B2 | * | 11/2003 | Helgeson et al. | 707/10 |

* cited by examiner

*Primary Examiner*—Jean M. Corrielus
(74) *Attorney, Agent, or Firm*—Bingham McCutchen LLP

(57) ABSTRACT

The present invention provides a method and mechanism to store and manage self-descriptive heterogeneous data in a database system. In one embodiment, a generic datatype is defined which encapsulate type descriptions along with the actual data itself. Another generic datatype is defined to encapsulate structural information for new datatypes. By using these generic datatypes to encapsulate heterogeneous data, the database system can be made aware of the exact structure and format of the heterogeneous data. This permits users and the database system to store, manage, and access the heterogeneous data like known datatypes in the system. Other objects, advantages, and features of the invention are described in the Drawings, Claims, and Detailed Description.

35 Claims, 8 Drawing Sheets

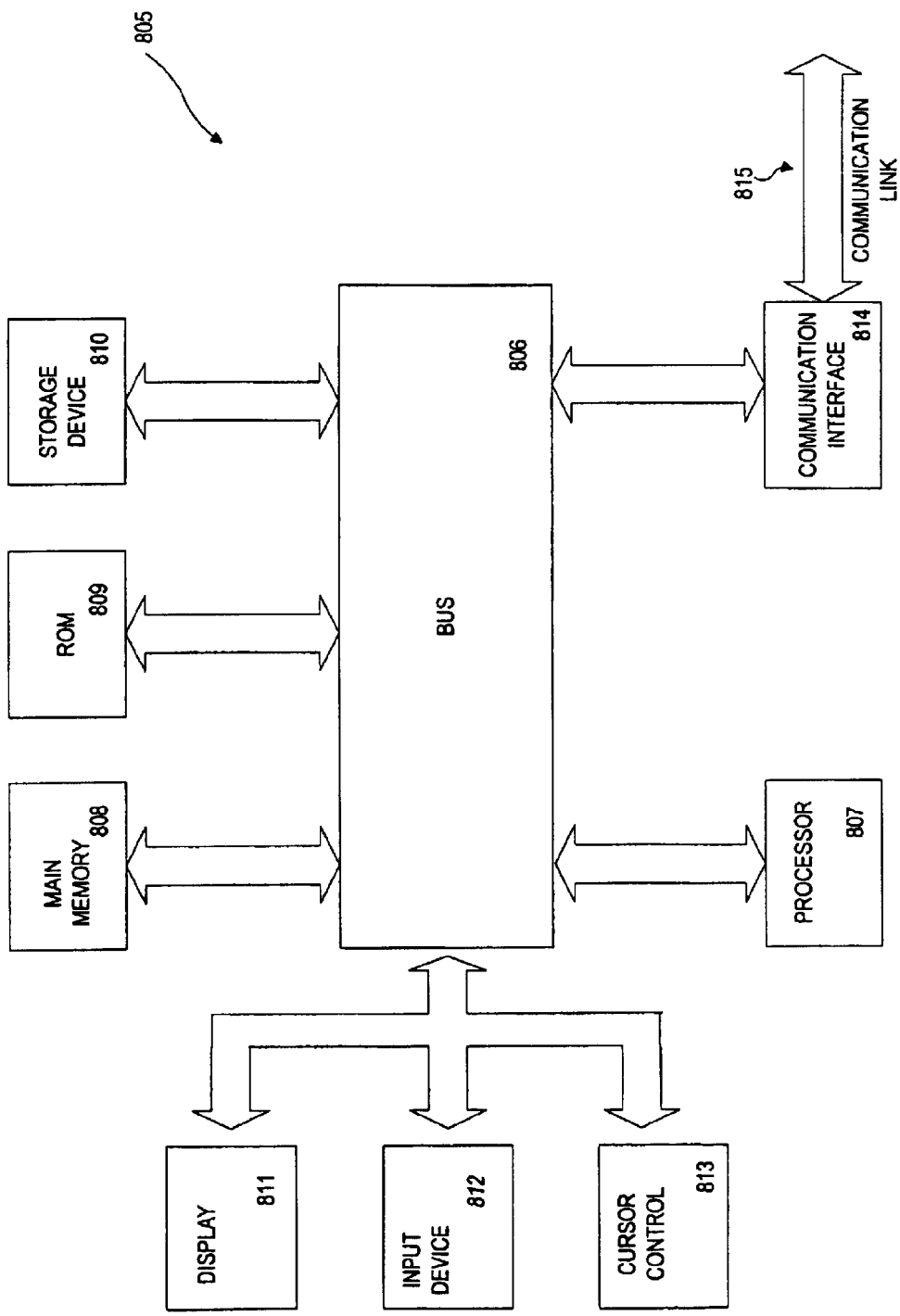

METHOD AND MECHANISM FOR STORING AND MANAGING SELF-DESCRIPTIVE HETEROGENEOUS DATA

BACKGROUND

Many types of data can be stored in a database system. Examples of well-recognized datatypes that are natively used in almost every database systems include strings, numbers, characters, and dates. Database systems also exist which allow users to define non-native data types to be stored and managed in the database. For example, Oracle Corporation of Redwood Shores, Calif. provides a number of database management products that facilitate the definition and use of non-native data types and their associated data access functions.

Database systems typically implement very strong type-checking within the infrastructure used to store and manage information in the database. As just one example, data containers in a relational database, such as a table column, are created and defined to be associated with a specific datatype. Once a column is so defined, only data of the specified datatype can be permissively stored in that database column. It is not normally possible to store data of an undefined datatype within the column. Nor is it possible to store multiple kinds of heterogenous datatypes within a defined column. In addition, conventional database systems also implement strong type-checking for functions and procedures. It is normally not permitted to pass function parameters that are potentially heterogeneous and of different possible datatypes.

Strong type-checking in a database system is often very desirable because many database operations and functions are configured to only work with specific datatypes. If such operations or functions are performed against the wrong datatype, then an erroneous result or fatal computation errors may occur in the database system.

However, strong type-checking may also present a source of inefficiency to a database system. Under certain circumstances, it is not always known in advance the exact datatypes to be used in a database operation. This may occur, for example, if an operation requires the source of data or the contents of data to become known only at execution or run time. If the datatype to be operated upon is unknown, it may be impossible in conventional database systems to predefine functions or operations that will properly access the data. In addition, the datatype(s) of result sets from operating upon the unknown datatypes may likewise be unknown in advance, rendering it impossible to predefine storage structures in the database system to store the anticipated result sets.

Consider if a database application already exists that was built to store and manage information relating to the sale of a first product family. The database application defines a set of storage structures and functions that are specific to managing information about sales for the first product family. Now consider if the user of the database application later wishes to begin selling a second product family, in which similar information must be stored for both the first and second product families, but the exact datatypes used in a database to manage information for each product family differ. Because database systems impose strict type-checking, it is most likely not possible for the existing database application to manage information for both product families. Under this circumstance, a significant amount of effort and resources may be needed to retrofit the database application to work with the additional datatypes associated with the second product family. This exemplifies the type of inefficiencies that may result from strong type-checking when attempting to evolve or maintain an existing database application.

SUMMARY

The present invention provides a method and mechanism to store and manage self-descriptive heterogeneous data in a database system. In one embodiment, a generic datatype is defined which encapsulate type descriptions along with the actual data itself. Another generic datatype is defined to encapsulate structural information for new datatypes. By using these generic datatypes to encapsulate heterogeneous data, the database system can be made aware of the exact structure and format of the heterogeneous data. This permits users and the database system to store, manage, and access the heterogeneous data like known datatypes in the system. Other objects, advantages, and features of the invention are described in the Drawings, Claims, and Detailed Description.

BRIEF DESCRIPTION OF THE DRAWINGS

The accompanying drawings are included to provide a further understanding of the invention and, together with the Detailed Description, serve to explain the principles of the invention.

FIGS. 7 and 8 are diagrams of system architecture(s) with which the present invention can be implemented.

DETAILED DESCRIPTION OF EMBODIMENT(S)

The invention, according to an embodiment, is directed to a system and method for storing and managing self-descriptive heterogeneous data. In one embodiment, a generic datatype is defined which encapsulates type descriptions along with the actual data itself. Another generic datatype is defined to encapsulate structural information for new datatypes. By using these generic datatypes to encapsulate heterogeneous data, the database system can be made aware of the exact structure and format of the heterogeneous data. This permits users and the database system to store, manage, and access the heterogeneous data like known datatypes in the system.

According to an embodiment of the invention, a generic datatype to store and encapsulate type information for datatypes, referred to herein as ANYTYPE, is defined and supported in the database system. The ANYTYPE datatype holds structural and formatting information for self-descriptive heterogeneous data according to the invention. If a new datatype structure is to be used in the database system, then a corresponding ANYTYPE instance is created corresponding to the new datatype. There may be multiple ANYTYPE instances defined in the system, corresponding to multiple datatypes that the database wishes to store, access, and/or operate upon.

According to one embodiment, the process to define a new datatype is a two step process of first creating a new ANYTYPE instance for the datatype, and then defining the ANYTYPE instance with information about the structure or format of the new datatype.

Creating and defining an ANYTYPE instance essentially registers the datatype corresponding to the ANYTYPE instance with the database system. This provides the information to the database that allows the new datatype to be recognized and operated upon like other datatypes known to the database. When a user seeks to access a piece of data corresponding to an ANYTYPE instance, that access is permitted and facilitated since the structure of that datatype is known based upon information located in its corresponding ANYTYPE instance.

Figures 1, 3:
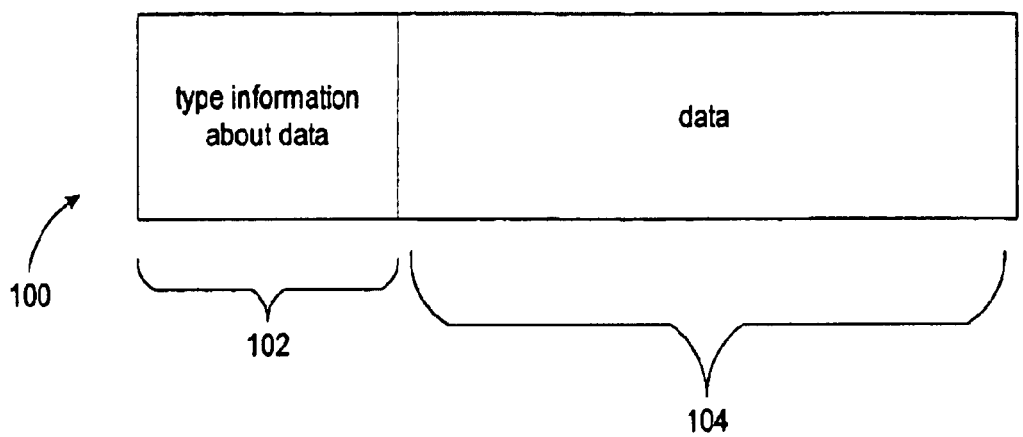
FIG. 1 shows a self-descriptive data structure for holding heterogeneous data according to an embodiment of the invention.
FIG. 3 shows an illustrative example of an ANYDATA structure according to an embodiment of the invention.

According to an embodiment of the invention, a self-descriptive heterogeneous datatype is defined that encapsulates type description as well as the data itself. FIG. 1 logically represents this datatype, which is referred to herein as the ANYDATA datatype 100. The ANYDATA datatype 100 includes a description portion 102 that comprises type information for data to be stored in the ANYDATA datatype 100. The ANYDATA datatype 100 also includes a data portion 104 that contains the actual data. Any heterogeneous data may be stored in the data portion 104. Regardless of the type of heterogeneous data stored in the data portion 104, information that describes the structure and format of that data is also stored in the description portion 102. The information in the description portion 102 provides sufficient information describe the properties of data in the data portion 104 and to allow access to that data.

In one embodiment, the description portion 102 merely contains an identifier or link to the ANYTYPE instance corresponding to ANYDATA instance. When accessing the ANYDATA instance, the ANYTYPE identifier/link is followed to obtain more detailed information about the structures or types of data stored in the data portion 104. In an alternate embodiment, the description portion 102 itself contains sufficient information to describe the structure, type, and/or attributes of the data in the data portion 104. For example, the ANYTYPE can be stored as part of the ANYDATA object that includes the self-descriptive information.

Figure 2:
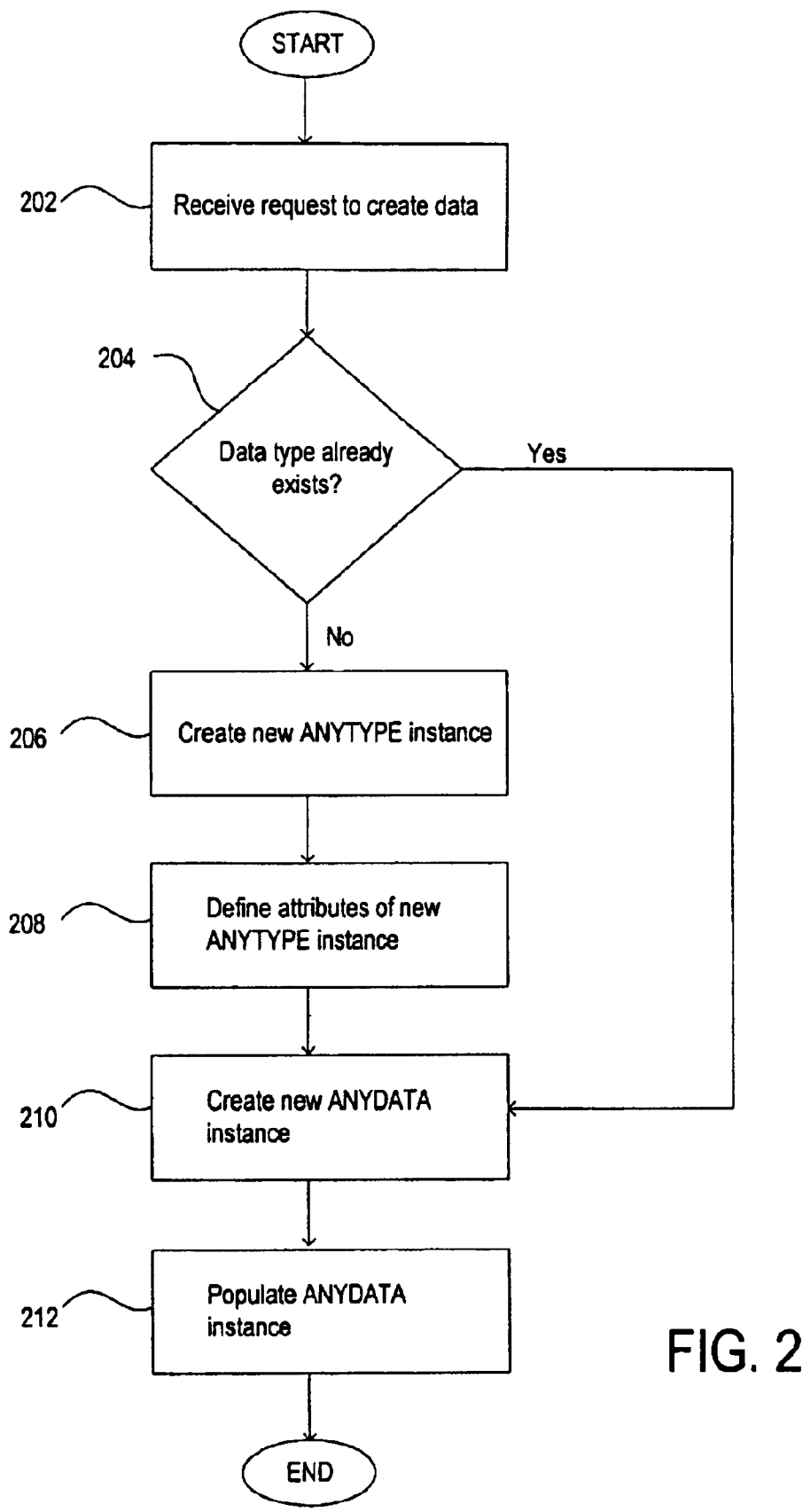
FIG. 2 depicts a flowchart of a process for storing self-descriptive heterogeneous data according to an embodiment of the invention.

FIG. 2 shows a flowchart of an embodiment of the invention for creating a new piece of data. At step 202 a request is received to create a new data structure for an item of data. At step 204, a determination is made regarding whether the new item of data is a recognized datatype in the database. In one embodiment, this step identifies whether an ANYTYPE instance has already been created for the datatype corresponding to the data item.

If the appropriate ANYTYPE instance has not yet been defined, then a new ANYTYPE instance is created at step 206. At step 208, the attributes of the new ANYTYPE instance is defined. In one embodiment, step 208 includes the action of identifying the structure and contents of the new datatype, including the order in which data fields are located in the datatype, types of data to be stored in the data fields, the size of data fields, and any other information that is used or needed to allow access and management of the new datatype.

When the process has ensured that an ANYTYPE instance exists for the datatype, a new instance of the ANYDATA datatype is created at step 210. The description portion 102 of the ANYDATA instance is configured with type description information for the new data item. At step 212, the data field(s) within the new ANYDATA instance is populated with data associated with the new data item.

As an illustrative example, consider if it is desired to define a new datatype in the database system with the following attributes: (a) a first portion of the new datatype contains a number with 5 digits; (b) a second portion of the datatype includes a string comprising 5 characters; and (c) a third portion of the new datatype includes a date. The new datatype is called "object_type_1". A new data item for the datatype will includes the following data: "00005SmithOct31,2001".

The first action is to create a new ANYTYPE instance appropriate for the new object_type_1 datatype. The following pseudocode describes a procedure for creating this new ANYTYPE instance:

```
Create ANYTYPE (datatype_name=object_type_1, type=new object)
    Define 1st Attribute
        Attribute type = number
        size of data field for attribute = 5 digits
    Define 2nd Attribute
        Attribute type = string
        Size of data field for attribute = 5 characters
    Define 3rd Attribute
        Attribute type = date
        Format of date field = "Month Date, Year"
End Create
```

In this pseudocode "Create ANYTYPE (datatype_name= object_type_1, type=new object)" represents a statement for creating a new instance of the ANYTYPE datatype, in which the defined name for the new datatype associated with the new instance is represented by "object_type_1".

In an embodiment, the "type" of the new datatype can also be identified when the instance is created. If the new datatype is defined to be an object, then attributes are defined for the new object type. When the new datatype is defined to be a collection (a set of data of a particular data type), then the set/array structure for the collection is defined. Another example of a datatype that may be represented by the ANYTYPE datatype is a nested table collection. Other and additional types can also be represented in the present invention.

The type of the new datatype can also be a built-in datatype. In an embodiment, built-in datatypes are types for which the structure of the datatype has already been defined in the database. The attribute and structure of information for built-in datatypes are presumed to be known and/or defined in the database system. For example, it is likely that the "number" and "string" datatypes are already recognized by the database system. Structural information about these datatypes should be registered with the database when the datatype is defined as a built-in datatype (e.g., precision and scale information for the number datatype or character set information for strings).

In the illustrative example, the type of the new datatype was defined to be an object. Thus, additional statements are included in the example pseudocode to define the attributes of the new object type. These additional statements define the order in which data fields exist in the new datatype, as well as the composition and structure of the data fields. In this example, the first data field in the new datatype is a number field having 5 digits. Therefore, the first set of statements to define an attribute relates to defining this first data field for a number. The second data field in the new datatype is a string having 5 characters; therefore, the second set of statements defines this string field. The final data field in the new datatype is a date field; therefore, the last set of statements defines the date field for the datatype.

A new data item having the specified data value ("00005SmithOct31, 2001") is created once the new ANYTYPE instance for the object_type_1 datatype has been defined. In an embodiment, an ANYDATA instance is created to hold the new data item. The following pseudocode describes a procedure for creating this new ANYDATA instance:

```
Create ANYDATA (datatype = object_type_1)
    Add 1st Attribute Value
        Attribute value = 00005
    Add 2nd Attribute Value
        Attribute value = "Smith"
    Add 3rd Attribute Value
        Attribute value = Oct 31, 2001
End Create
```

In this pseudocode, "Create ANYDATA (datatype= object_type_1)" represents a statement for creating a new instance of the ANYDATA datatype, in which the defined type for the new data item is represented by the "object_type_1" type. For each attribute of a new object type instance, the construction process inserts a new piece of data into the ANYDATA instance in the appropriate data field. In a similar manner, if the new data item is a collection, each set element of the collection is inserted into the collection ANYDATA instance. In this example, the first attribute/data field of the data item is defined to be a number having the value "0005". The second attribute/data field is defined to be a string having the value "Smith". The third attribute/data field is defined to be a date field having the value "Oct. 31, 2001". An illustrative ANYDATA instance for this example is shown in FIG. 3.

For built-in datatypes, it is noted that an abbreviated procedure may be instituted to define a new instance of the corresponding ANYDATA datatype. For each built-in datatype, a direct conversion operation may be defined that explicitly casts the data value into a corresponding ANYDATA instance. In one approach, this process defines a new ANYDATA instance in which the type information for the appropriate built-in datatype is included in the description portion 102 of the ANYDATA instance and the data is included in the data portion 104.

It is noted that many procedures for linearizing data, e.g., pickling, can be used to construct the ANYDATA instance. While conventional pickling techniques do not create or permit user-accessible or user-defined datatypes, these techniques can be advantageously utilized in conjunction with the present invention to generate a specific storage format for information in an ANYDATA instance.

In one embodiment of the invention, the allocation duration of the new type can also be defined for the ANYTYPE instance. The allocation duration can be a predefined or a user defined duration. A persistent type is a datatype that is persistently stored in the database system. A transient type refers to type descriptions that are not persistently stored in the database. Defining a transient type, rather than a persistent type, may be appropriate under certain circumstances, e.g., for intermediate data operations. For example, a transient type may be created on an ad hoc basis to hold intermediate data results arising from aggregating data from multiple columns, in which the datatypes of the source columns are unknown, and therefore the datatype of the intermediate result set may also be unknown. The intermediate result set is used to create a final result set before being discarded, and therefore will not be persistently stored. As such, the allocation duration of the new type for the intermediate result set can be set for a non-persistent period of time.

In an embodiment, a new ANYTYPE instance can include a previously defined ANYTYPE instance. For example, consider another new datatype, called "object_type_2", which includes a first data field for a string having 4 characters and a second data field of the type object_type_1 that was previously defined. The following pseudocode describes a procedure for creating this new ANYTYPE instance:

```
Create ANYTYPE (datatype_name=object_type_2, type=new object)
    Define 1st Attribute
        Attribute type = string
        Size of data field for attribute = 4 characters
    Define 2nd Attribute
        Attribute type = object_type_1
End Create
```

In this pseudocode, "Create ANYTYPE (datatype_name=object_type_2, type=new object)" represents a statement for creating a new instance of the ANYTYPE datatype, in which the defined name for the new datatype associated with the new instance is represented by "object_type_2". The first attribute for the new datatype represented by this ANYTYPE instance is defined to be a string attribute of 4 characters in length. The second attribute is defined to be of the object_type_1 type.

The following pseudocode describes a procedure for creating a data item comprising a new ANYDATA instance of this type in which the first field of the data item is "AAAA" and the second field of the data item is "00005SmithOct31, 2001":

```
Create ANYDATA (datatype = object_type_1)
    Add 1st Attribute Value
        Attribute value = "AAAA"
    Add 2nd Attribute Value
        Attribute value = "00005SmithOct31,2001"
End Create
```

In an embodiment, when adding an attribute which is defined to be another ANYTYPE object, the database system looks up the ANYTYPE definition of the attribute to recognize how to store the attribute data.

Figure 4:
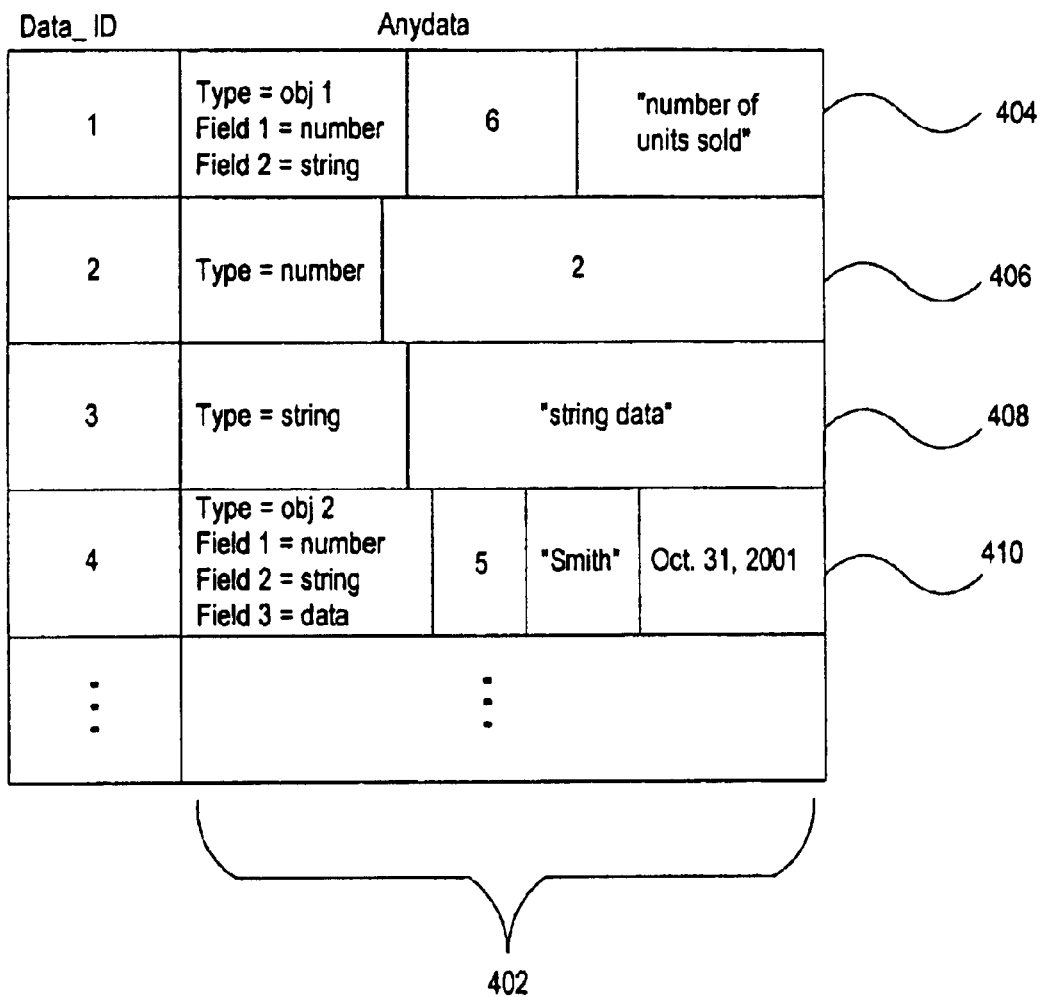
FIG. 4 shows an ANYDATA column according to an embodiment of the invention.

Once an ANYDATA instance is created for a data item, that data item can be stored in a database column like other recognized datatypes in the database system. In one embodiment, this is accomplished by defining an ANYDATA column for a database table. FIG. 4 shows an example of an ANYDATA column 402 The ANYDATA column 402 can store different datatypes, by storing different instances of the ANYDATA type corresponding to different ANYTYPE datatypes. The ANYDATA column 402 is preferably of variable length to hold different types of ANYDATA instances. In an embodiment, the ANYDATA column 402 is potentially unbounded in length. Shown in the example of FIG. 4 are rows 404, 406, 408, and 410 stored in the ANYDATA column 402, of types obj1, number, string, and obj2, respectively.

When an ANYDATA instance is created for a data item, that data item can be accessed like other datatypes in the database system. Since an instance of the ANYDATA type is self-describing (in the description portion 102), any database operation or function configured to dynamically access these generic datatypes can access and operate upon the data items (of unknown types) located within the type instances. Therefore, even without knowing in advance the exact datatype to operate upon, a programmer can define a function or operation to access the generic ANYDATA or ANYTYPE types knowing that the exact datatype incorporated by an instance of these types will be self-describing. A language neutral applications programming interface can be used to interface with the generic ANYDATA or ANYTYPE datatypes.

Figure 5:
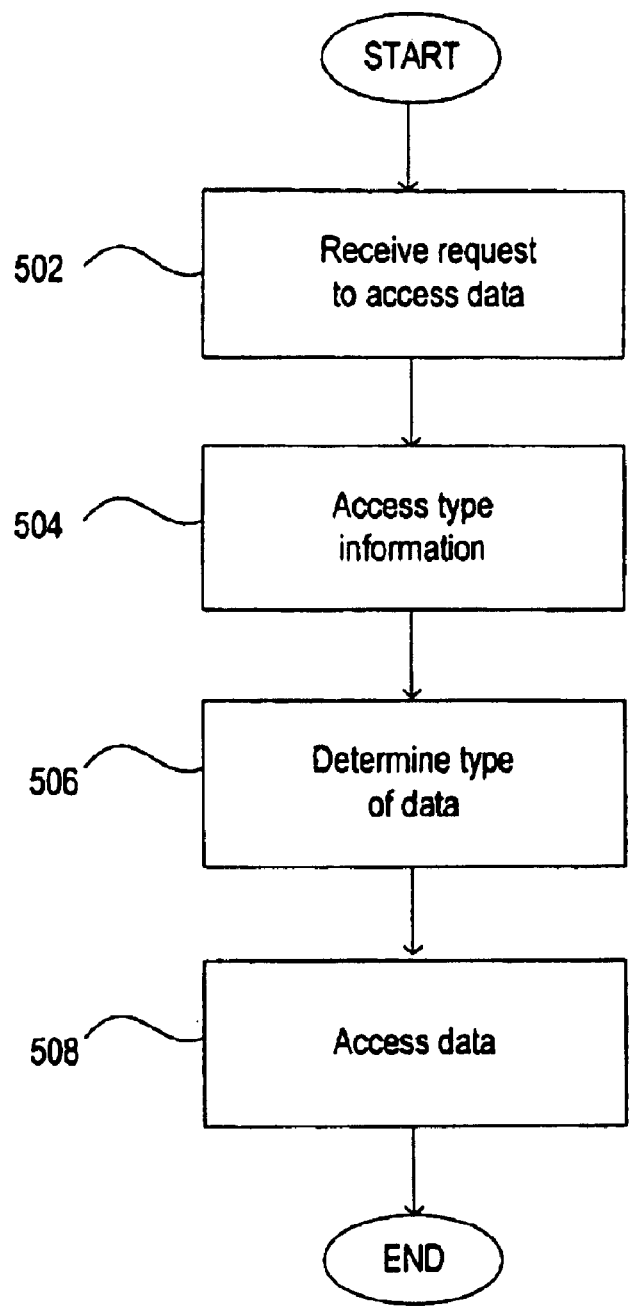
FIG. 5 is a flowchart of a process for accessing self-descriptive heterogeneous data according to an embodiment of the invention.

FIG. 5 shows a flowchart of a process for accessing data in an ANYDATA instance according to one embodiment of the invention. At step 502, the process receives a request to access a data item stored as an ANYDATA instance. The request could be in the form of a query against an ANYDATA column in a database table. At step 504, the type information for the ANYDATA instance is accessed to obtain information about the structure or format of data in the ANYDATA instance. If the description portion 102 of the ANYDATA instance only contain an identifier/link to the corresponding ANYTYPE instance, then the link is followed to retrieve the appropriate information. At step 506, a determination is made regarding the type(s) of data that is contained in the ANYDATA instance. At step 508, the data within the ANYDATA instance is accessed using operations or procedures appropriate for the type of information in the data portion 104 of the ANYDATA instance. In one embodiment, the entire contents of an ANYDATA instance is accessed at once, with each data field accessed in sequential order within the data instance. In an alternate embodiment, each data field within the data instance can be individually accessed on an individual piece-by-piece basis.

The present invention also provides a new approach for ensuring type-safety in a database system. By accessing type information before accessing data in the ANYDATA instance, the database system can ensure that only properly configured function, procedures, or operations usable with the identified datatype is used to access the data. This can be used to prevents the situation in which an procedure that expects a particular datatype is used to operate against a different datatype.

Figure 6A:
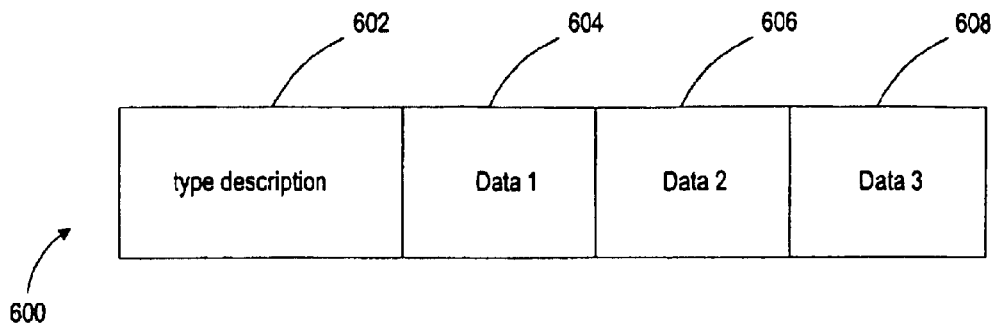
FIG. 6a shows a self-descriptive structure for holding a set of heterogeneous data according to an embodiment of the invention.

According to an embodiment, a generic datatype is implemented which encapsulates a type description, but which includes multiple values of the data of the relevant datatype within the ANYDATASET instance. This datatype is referred to herein as a ANYDATASET. FIG. 6*a* shows an example of the ANYDATASET datatype according to an embodiment, comprising a single type description portion 602 and three sets of data 604, 606, and 608. All data values 604, 606, and 608 in the ANYDATASET instance are of the same datatype. Thus, the information in the type description portion 602 is common to all three data values 604, 606, and 608

Figure 6B:
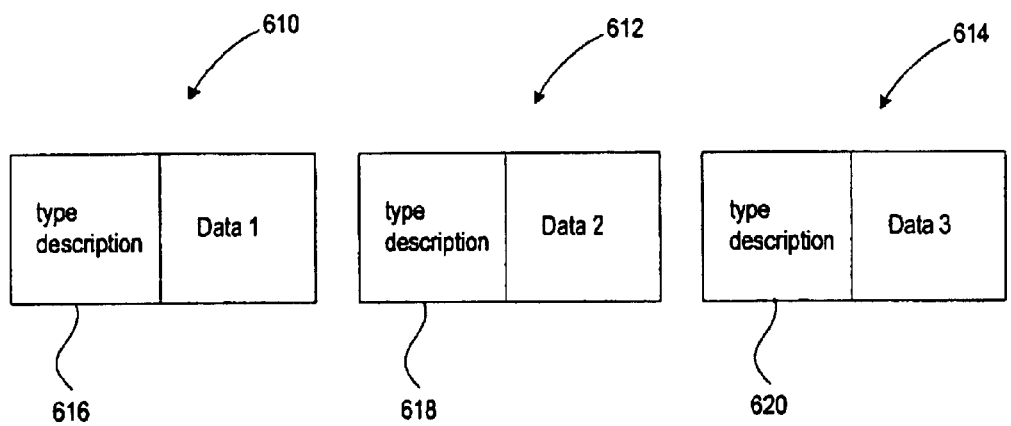
FIG. 6b shows an illustrative example of an ANYDATASET structure according to an embodiment of the invention.

To highlight the advantages presented by the ANYDATASET type, consider if the data in FIG. 6*a* is represented using the ANYDATA structure. As shown in FIG. 6*b,* three separate ANYDATA instances 610, 612, and 614 would be needed to store the data within the ANYDATASET instance 600. Using a single ANYDATASET instance is more efficient since only a single type description portion 602 is needed, rather than creating three separate type description portions 616, 618, and 620. Moreover, a single procedure can be used to create and populate the ANYDATASET instance, rather than three separate procedures to create and populate the three ANYDATA instances 610, 612, and 614. In addition, a single procedure can be used to enforce type constraints for multiple data item values in the ANYDATASET instance, rather than requiring separate type-checking procedures for each separate ANYDATA instance.

One scenario in which the ANYDATASET datatype can be advantageously used is when creating an index. Creating an index often involves accessing a number of data items that all share a common datatype. Since it is very probable that all the data items share the same datatype, only a single ANYDATASET instance can be created to store and access multiple data items used for generating an index on those data items.

Figure 9A:
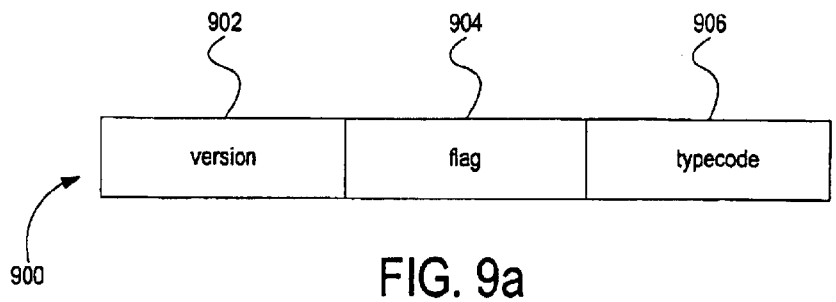
FIGS. 9a–9c depict embodiments of ANYTYPE structures.

FIG. 9*a* depicts the structure 900 of an ANYTYPE datatype for a built-in predefined type in the system according to an embodiment of the invention. The version field 902 contains information that describes the version of the ANYTYPE datatype being used. The flag field 904 holds a value indicating the predefined type being described. The typecode portion 906 describes the actual predefined type. For example, this field could include a first value indicates a number, a second value indicates a string, etc.

Figure 9B:
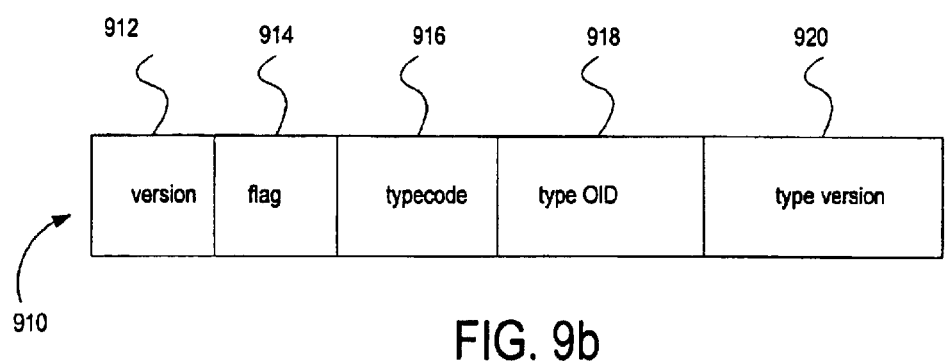

FIG. 9*b* depicts the structure 910 of an ANYTYPE datatype for an existing user-created type in the system, according to an embodiment of the invention. The version field 912, flag field 914, and typecode field 916 correspond to fields 902, 904, and 906 of structure 900 in FIG. 9*a.* The type_OID filed 918 stores information that identifies the actual type that has been created. The type version filed 920 stores version information for the object type.

Figure 9C:
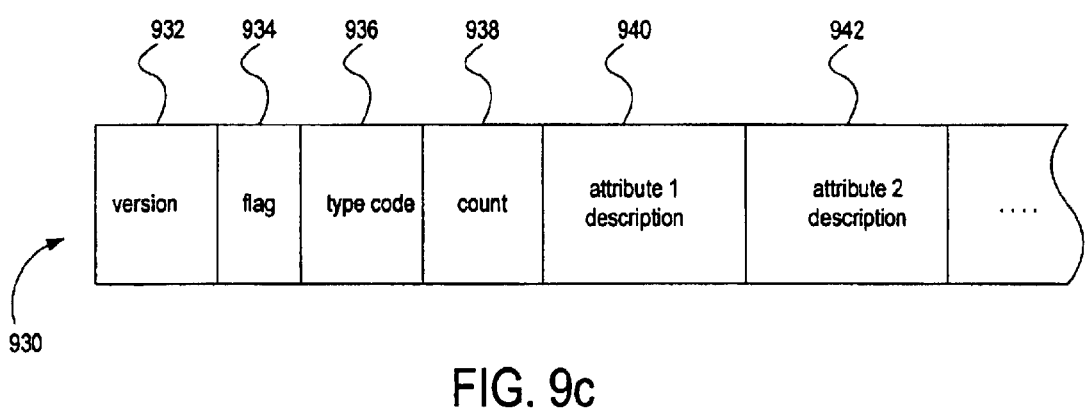

FIG. 9*c* depicts the structure 930 of an ANYTYPE datatype for a new type that is dynamically created, according to an embodiment of the invention. The version field 936, flag field 934, and typecode field 936 corresponds to fields 902, 904, and 906 of structure 900 in FIG. 9*a.* The count field 938 stores information that identifies the total number of attributes in the type. A description of each attribute type thereafter appears in the datatype object. For example, the description of a first attribute appears in field 940 and the description of a second attribute appears in field 942. Each of the descriptions for the attribute types use a similar format depending on whether the attribute is a predefined type, existing user-created type or a new type that is dynamically created.

Therefore, using the present invention, function, procedures, and operations can be predefined, even if it cannot be known in advance the exact datatypes that will be accessed or without knowing the exact return type from function, procedure, or operation. By using dynamic metadata and datatypes to define the return type, storage type, or accessible datatype of information to be operated upon, the flexibility of the database can be significantly improved, from both the operational and maintenance/evolution viewpoints. As noted above, this can be implemented using generic datatypes to encapsulate type descriptions and heterogeneous data, which can model any individual data, set of data, or collections of data for any returnable, unknown, or anticipated element or object type.

System Architecture Overview

Figure 7:
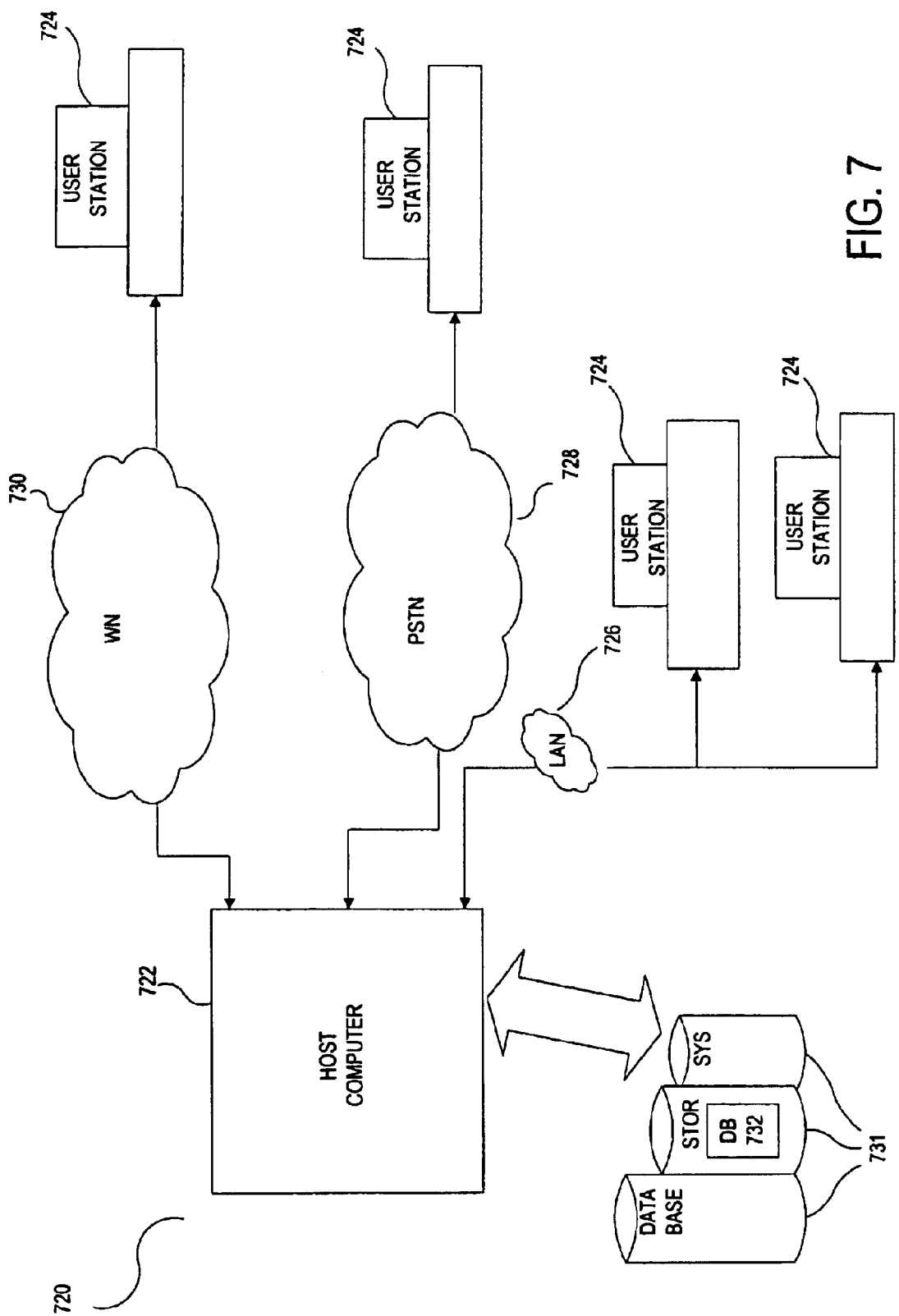

Referring to FIG. 7, in an embodiment, a computer system 720 includes a host computer 722 connected to a plurality of individual user stations 724. In an embodiment, the user stations 724 each comprise suitable data terminals, for example, but not limited to, e.g., computers, computer terminals or personal data assistants ("PDAs"), which can store and independently run one or more applications. For purposes of illustration, some of the user stations 724 are connected to the host computer 722 via a local area network ("LAN") 726. Other user stations 724 are remotely connected to the host computer 722 via a public switched telephone network ("PSTN") 728 and/or a wireless network 730.

In an embodiment, the host computer 722 operates in conjunction with a data storage system 731, wherein the data storage system 731 contains a database 732 that is readily accessible by the host computer 722. In alternative embodiments, the database 732 may be resident on the host computer. In yet alternative embodiments, the database 732 may be read by the host computer 722 from any other medium from which a computer can read. In an alternative embodiment, the host computer 722 can access two or more databases 732, stored in a variety of mediums, as previously discussed.

Referring to FIG. 8, in an embodiment, each user station 724 and the host computer 722, each referred to generally as a processing unit, embodies a general architecture 805. A processing unit includes a bus 806 or other communication mechanism for communicating instructions, messages and data, collectively, information, and one or more processors 807 coupled with the bus 806 for processing information. A processing unit also includes a main memory 808, such as a random access memory (RAM) or other dynamic storage device, coupled to the bus 806 for storing dynamic data and instructions to be executed by the processor(s) 807. The main memory 808 also may be used for storing temporary data, i.e., variables, or other intermediate information during execution of instructions by the processor(s) 807.

A processing unit may further include a read only memory (ROM) 809 or other static storage device coupled to the bus 806 for storing static data and instructions for the processor(s) 807. A storage device 810, such as a magnetic disk or optical disk, may also be provided and coupled to the bus 806 for storing data and instructions for the processor(s) 807. A processing unit may be coupled via the bus 806 to a display device 811, such as, but not limited to, a cathode ray tube (CRT), for displaying information to a user. An input device 812 is coupled to the bus 806 for communicating information and command selections to the processor(s) 807. A user input device may include a cursor control 813 for communicating direction information and command selections to the processor(s) 807 and for controlling cursor movement on the display 811.

According to one embodiment of the invention, the individual processing units perform specific operations by their respective processor(s) 807 executing one or more sequences of one or more instructions contained in the main memory 808. Such instructions may be read into the main memory 808 from another computer-usable medium, such as the ROM 809 or the storage device 810. Execution of the sequences of instructions contained in the main memory 808 causes the processor(s) 807 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 807. Such a medium may take many forms, including, but not limited to, non-volatile, volatile and transmission media. Non-volatile media, i.e., media that can retain information in the absence of power, includes the ROM 809. Volatile media, i.e., media that can not retain information in the absence of power, includes the main memory 808. Transmission media includes coaxial cables, copper wire and fiber optics, including the wires that comprise the bus 806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 807 can retrieve information.

Various forms of computer-usable media may be involved in providing one or more sequences of one or more instructions to the processor(s) 807 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 806 may receive the infrared signals and place the instructions therein on the bus 806. The bus 806 may carry the instructions to the main memory 808, from which the processor(s) 807 thereafter retrieves and executes the instructions. The instructions received by the main memory 808 may optionally be stored on the storage device 810, either before or after their execution by the processor(s) 807.

Each processing unit may also include a communication interface 814 coupled to the bus 806. The communication interface 814 provides two-way communication between the respective user stations 724 and the host computer 722. The communication interface 814 of a respective processing unit transmits and receives electrical, electromagnetic or optical signals that include data streams representing various types of information, including instructions, messages and data. A communication link 815 links a respective user station 724 and a host computer 722. The communication link 815 may be a LAN 726, in which case the communication interface 814 may be a LAN card. Alternatively, the communication link 815 may be a PSTN 728, in which case the communication interface 814 may be an integrated services digital network (ISDN) card or a modem. Also, as a further alternative, the communication link 815 may be a wireless network 730. A processing unit may transmit and receive messages, data, and instructions, including program, i.e., application, code, through its respective communication link 815 and communication interface 814. Received program code may be executed by the respective processor(s) 807 as it is received, and/or stored in the storage device 810, or other associated non-volatile media, for later execution. In this manner, a processing unit may receive messages, data and/or program code in the form of a carrier wave.

In the foregoing specification, the invention has been described with reference to specific embodiments thereof It will, however, be evident that various modifications and changes may be made thereto without departing from the broader spirit and scope of the invention. The reader is to understand that the specific ordering and combination of process actions shown in the process flow diagrams described herein is merely illustrative, and the invention can be performed using different or additional process actions, or a different combination or ordering of process actions. For example, the invention has been described herein with respect to relational database objects, such as table columns, but the invention is equally applicable to other types of database objects or even to non-database objects and programming languages. The specification and drawings are, accordingly, to be regarded in an illustrative rather than restrictive sense.

What is claimed is:

1. A method for generating self-descriptive heterogeneous data, comprising:
   receiving a request to create a self-descriptive heterogeneous data item;
   creating an instance of a generic typing datatype, the instance of the generic typing datatype comprising first type information for a datatype associated with the self-descriptive heterogeneous data item;
   creating a generic datatype instance, the generic datatype instance comprising a first portion and a second portion, the first portion comprising typing information for the datatype associated with the self-descriptive heterogeneous data item; and
   populating the second portion with data for the self-descriptive heterogeneous data item.

2. The method of claim 1 further comprising:
   creating a database column for the generic datatype; and
   inserting the generic datatype instance into the database column.

3. The method of claim 2 further comprising:
   creating a second instance of the generic typing datatype, the second instance of the generic typing datatype comprising type information for a second datatype;
   creating a second generic datatype instance, the second generic datatype instance associated with the second datatype; and
   storing the second generic datatype instance in the database column.

4. The method of claim 1 wherein the first portion comprises an identifier to the instance of the generic typing datatype.

5. The method of claim 1 wherein the first portion comprises at least some of the type information stored in the instance of the generic typing datatype.

6. The method of claim 1 wherein a new instance of the generic typing datatype is created for each different datatype.

7. The method of claim 1 wherein the instance of the generic typing datatype is an object datatype.

8. The method of claim 7 wherein the step of populating the second portion comprises adding data for each attribute of the instance of the generic typing datatype.

9. The method of claim 7 wherein the steps of creating and populating the second portion is performed in a direct casting procedure.

10. The method of claim 1 wherein the instance of the generic typing datatype is a built-in datatype.

11. The method of claim 1 wherein a duration is defined for the instance of the generic typing datatype.

12. The method of claim 11 wherein the duration for the instance of the generic typing datatype is a transient time period.

13. The method of claim 1 further comprising:
    receiving a request to access the generic datatype instance;
    accessing the first portion of the generic datatype instance for the typing information; and
    accessing the data in the second portion using the typing information.

14. The method of claim 13 further comprising:
    type-checking based upon the typing information.

15. The method of claim 13 further comprising:
    accessing the instance of the generic typing datatype to retrieve the type information.

16. The method of claim 1 wherein pickling is employed to create and populate the generic datatype instance.

17. The method of claim 1 wherein the generic datatype instance stored information for multiple data items.

18. The method of claim 17 wherein the multiple data items are of the same datatype.

19. The method of claim 18 further comprising:
    receiving a request to create a second self-descriptive heterogeneous data item, the second self-descriptive heterogeneous data item also of the datatype associated with the self-descriptive heterogeneous data item; and
    populating the second portion with additional data for the second self-descriptive heterogeneous data item.

20. The method of claim 1 wherein the generic typing datatype comprises a type identifier field.

21. The method of claim 1 wherein the generic typing datatype comprises an attribute description.

22. The method of claim 1 wherein the generic typing datatype comprises version information.

23. The method of claim 1 wherein the first portion is populated with information from the generic typing datatype.

24. A method for accessing self-descriptive heterogeneous data, comprising:
    receiving a request to access a self-descriptive heterogeneous data item, the self-descriptive heterogeneous data item corresponding to a specially configured generic typing datatype and a datatype instance;
    accessing typing information in the datatype instance, wherein the datatype instance comprises a first portion and a second portion, wherein the first portion comprising typing information for the datatype associated with the self-descriptive heterogeneous data item and an identifier to the instance of the specially configured generic typing datatype, and wherein the second portion comprising data for the self-descriptive heterogeneous data item; and
    accessing data in the datatype instance based on the procedures appropriate for the type of information.

25. The method of claim 24 wherein the datatype instance is stored in a database column for generic datatypes.

26. The method of claim 25 wherein the database column comprises multiple types of specially configured generic datatypes.

27. The method of claim 24 wherein a new instance of the specially configured generic typing datatype is created for each different datatype.

28. The method of claim 24 wherein the self-descriptive heterogeneous data item corresponds to a built-in datatype.

29. The method of claim 24 wherein a duration is defined for the self-descriptive heterogeneous data item.

30. The method of claim 24 further comprising:
type-checking based upon the typing information.

31. The method of claim 24 wherein the specially configured generic datatype instance stores information for multiple data items.

32. A computer program product that includes a computer-usable medium comprising a sequence of instructions which, when executed by a processor, causes said processor to execute a process for accessing self-descriptive heterogeneous data, said process comprising:
receiving a request to access a self-descriptive heterogeneous data item, the self-descriptive heterogeneous data item corresponding to a specially configured generic typing datatype and a datatype instance;
accessing typing information in the datatype instance, wherein the datatype instance comprises a first portion and a second portion, wherein the first portion comprising typing information for the datatype associated with the self-descriptive heterogeneous data item and an identifier to the instance of the specially configured generic typing datatype, and wherein the second portion comprising data for the self-descriptive heterogeneous data item; and
accessing data in the datatype instance based on the procedures appropriate for the type of information.

33. A computer program product that includes a computer-usable medium comprising a sequence of instructions which, when executed by a processor, causes said processor to execute a process for generating self-descriptive heterogeneous data, said process comprising:
receiving a request to create a self-descriptive heterogeneous data item;
creating an instance of a generic typing datatype, the instance of the generic typing datatype comprising first type information for a datatype associated with the self-descriptive heterogeneous data item;
creating a generic datatype instance, the generic datatype instance comprising a first portion and a second portion, the first portion comprising typing information for the datatype associated with the self-descriptive heterogeneous data item; and
populating the second portion with data for the self-descriptive heterogeneous data item.

34. A system for accessing self-descriptive heterogeneous data, said process comprising:
means for receiving a request to access a self-descriptive heterogeneous data item, the self-descriptive heterogeneous data item corresponding to a specially configured generic typing datatype and a datatype instance;
accessing typing information in the datatype instance, wherein the datatype instance comprises a first portion and a second portion, wherein the first portion comprising typing information for the datatype associated with the self-descriptive heterogeneous data item and an identifier to the instance of the specially configured generic typing datatype, and wherein the second portion comprising data for the self-descriptive heterogeneous data item; and
means for accessing data in the datatype instance based on the procedures appropriate for the type of information.

35. A system for generating self-descriptive heterogeneous data, said process comprising:
means for receiving a request to create a self-descriptive heterogeneous data item;
means for creating an instance of a generic typing datatype, the instance of the generic typing datatype comprising first type information for a datatype associated with the self-descriptive heterogeneous data item;
means for creating a generic datatype instance, the generic datatype instance comprising a first portion and a second portion, the first portion comprising typing information for the datatype associated with the self-descriptive heterogeneous data item; and
means for populating the second portion with data for the self-descriptive heterogeneous data item.

* * * * *